Patented July 6, 1943

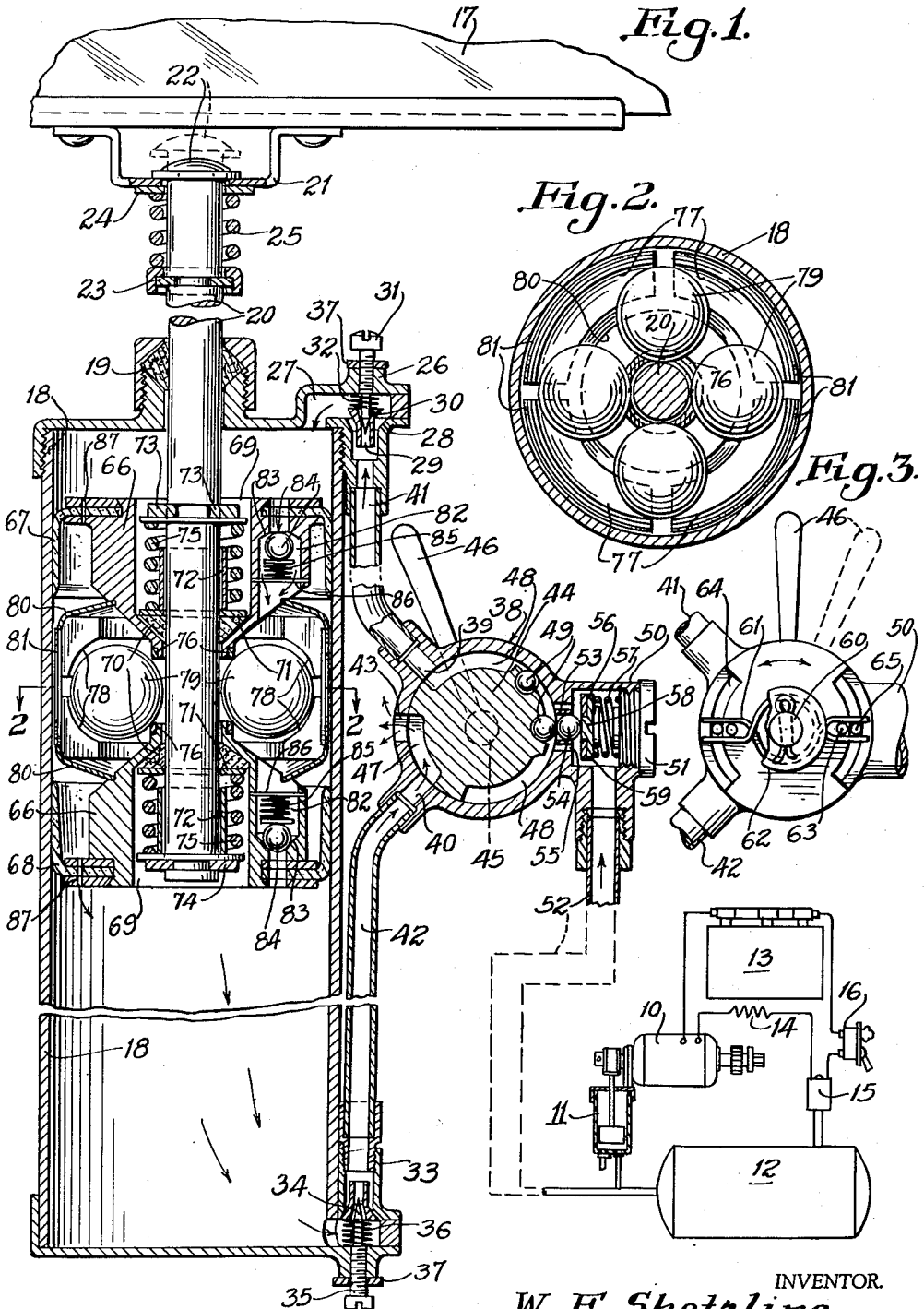

2,323,731

UNITED STATES PATENT OFFICE 2,323,731

WINDOW OPERATING MEANS

Walter F. Shetzline, Los Angeles, Calif.

Application January 29, 1941, Serial No. 376,461

8 Claims. (Cl. 268—125)

My invention relates to means for operating windows and the sliding glass panels of windows and the invention as herein disclosed is especially designed for use in conjunction with the windows and sliding glass panels of motor vehicles, railway coaches, and the like.

My present invention is an improvement on the automobile window operating means set forth in U. S. Letters Patent issued to me June 4, 1935, No. 2,003,614.

The principal objects of my present invention are, to generally improve upon and simplify the construction of the window operating means disclosed in my aforesaid patent, as well as other forms of window and panel operating structures and further, a provide window and panel operating means that utilizes compressed air as its motive force and while such power for effecting movements of windows and panels within their frames has heretofore been used, my invention contemplates improved means and arrangements for utilizing this source of power.

A further object of my invention is, to provide a compressed air actuated window and panel operating means and to combine therewith a brake or clutch construction for holding the window or sliding panel in both open and closed positions, as well as in intermediate positions. The invention also contemplates an arrangement whereby the brake or clutch mechanism acts automatically and in synchronism with the window raising and lowering operation so that, when it is desired to raise or lower the window, the brake or clutch will be automatically released to permit the raising and lowering functions to be accomplished, and when the window or panel has been raised or lowered to the desired point, the brake or clutch will automatically engage a part of the operating mechanism to effectually clamp and hold the window or panel against further movement.

A further object of my invention is, to provide means whereby the window or sliding panel may be moved to any desired position with the utmost speed and to cushion said window or panel at the termination of either upward or downward travel. In this connection it will be understood that from a safety standpoint involving the giving of arm signals by the driver of a vehicle, the rapid lowering of the window or panel is most essential.

A further object of my invention is, to utilize the starting motor of a motor vehicle to operate an air compressor which furnishes the compressed air that operates the window or panel operating device, and to accomplish this object I propose to reduce the speed of the starting motor by means of resistance or special winding of the starting motor or by some other electrical means.

A further object of my invention is, to provide a master control valve which is incorporated within the distributing valve and which master valve is especially designed so as to retain the compressed air within a storage tank that forms a part of the window operating apparatus.

Further objects of my invention are, to provide in the distributing valve a plurality of hardened steel balls for the purpose of minimizing wear within said valve and enabling the same to be easily operated at all times and further, to provide an improved form of check valve that will be highly effective in preventing leakage of the compressed air from the storage tank forming a part of the apparatus.

With the foregoing and other objects in view, my invention consists in certain novel features of construction and arrangement of parts that will be hereinafter more fully described and claimed and illustrated in the accompanying drawing in which:

Fig. 1 is a section taken lengthwise through my improved window and panel operating means and showing diagrammatically certain of the essential parts of the system or apparatus.

Fig. 2 is a horizontal section taken on the line 2—2 of Fig. 1.

Fig. 3 is a side elevational view of the valve utilized for controlling the operation of the window raising and lowering means.

Referring by numerals to the accompanying drawing which illustrates a preferred embodiment of my invention, 10 designates the conventional starting motor of a motor vehicle, 11 a compressor that is actuated by said motor, 12 a storage tank for the air compressed by the compressor 11, 13 a storage battery that supplies current to the starting motor, 14 a resistance in the motor circuit, 15 an automatic switch controlled by the pressure of air within tank 12 and 16 a switch that controls the motor circuit and which switch is located preferably on the dash or instrument board of the motor vehicle.

Located beneath the window or panel 17 that is to be raised and lowered is a vertically disposed cylinder 18 closed at both ends and provided at its upper end with a gland or stuffing box 19 for a piston rod 20. The upper end of this piston rod passes through a short substantially U-shaped strap 21 that is secured to the lower edge of the window or panel and a head 22 on the upper end of the piston rod is positioned above the central portion of said strap.

Secured on the piston rod a short distance below its upper end and below strap 21 is a disc 23 and interposed between said disc 23 and a disc 24 that is loosely arranged on the piston rod beneath the strap, is an expansive coil spring 25 that is utilized as a cushion for the window or panel at the ends of its travel.

Fitted onto the upper end of cylinder 18 is a valve housing 26 and one end of the duct or opening 27 therethrough communicates with the upper end of the chamber within the cylinder 18. Formed in the intermediate portion of duct 27 is a valve seat 28 upon which rests the tapered upper end of a short tubular valve 29, the diameter of the lower portion thereof being less than that portion of the duct 27 into which said lower portion projects. The upper end of the opening through the tubular valve 29 is provided with a tapered seat 30 and extending thereinto is the tapered lower end of a screw 31 that is seated in the upper portion of the valve housing 26. Surrounding the lower portion of screw 31 and interposed between the upper end of tubular valve 29 and the upper portion of the valve housing 26 is an expansive spring 32 that yieldingly resists upward movement of the tubular valve 29.

Mounted on the lower end of the cylinder 18 is a valve housing 33 that is practically the same as valve housing 26 and this lower valve housing contains an upwardly seating tubular valve 34 practically identical in construction with tubular valve 29, and seated in the lower portion of the housing 33 is a screw 35 similar to screw 31 and the pointed end of which screw 35 projects into the tapered lower end of the opening through valve 34.

An expansive spring 36 carried by screw 35 yieldingly resists downward movement of the tubular valve 34. Lock nuts 37 are located on the screws 31 and 35 in order to lock the same to the valve housings in differently adjusted positions.

Located at a point convenient to the vehicle driver's seat is a valve housing 38 provided in its periphery with ports 39 and 40. A tube 41 leads from port 39 to the valve housing 26 and a similar tube 42 connects port 40 with valve housing 33.

Formed through the wall of the valve housing 38 between the ports 39 and 40 is an exhaust port 43 and mounted for rotation within the valve housing 38 is a valve 44 having an axially disposed stem 45 that projects through the side wall of housing 38 and receives an operating handle 46.

Formed in the periphery of valve 44 is a port 47 which, as the valve is shifted from one position to another, is adapted to establish communication between the ports 39 and 40 and the exhaust port 43.

Formed in the periphery of valve 44 is a duct 48 which, as the valve is shifted from one position to another, is adapted to alternately communicate with the ports 39 and 40.

Loosely seated in recesses formed in valve 44 adjacent the center of duct 48 are hardened steel balls 49 that ride on the inner surface of the valve housing 38 so as to minimize friction between the valve and its housing while said valve is being shifted from one position to another. These balls are spaced apart a distance approximately equal to the length of port 47.

Formed integral with valve housing 38 is an outwardly projecting secondary housing 50, the outer end of which is closed by a removable plug 51, and a duct 52 leads from compressed air storage tank 12 to the chamber within housing 50. Formed through the wall between the housings 38 and 50 is an opening 53 within which is loosely arranged a hardened metal ball 54 and formed through said wall surrounding this opening 53 is a series of small ports 55 that establish communication between the chambers within the housings 38 and 50.

Loosely arranged within the chamber in housing 50 is a disc valve 56 and interposed between said valve and the plug 51 is an expansive spring 57. Formed on the central portion of the front face of valve 56 is a stud 58 that normally engages the surface of ball 54 and surrounding this stud 58 is a packing ring or disc 59 which, when the valve travels forward to its limit of movement under the influence of spring 57, closes the ports 55 and consequently prevents flow of compressed air from duct 52 through housing 50 and through said ports 55.

A trunnion 60 projects from the center of valve 44 through the side of housing 38 on the opposite side from the handle 46 and arranged on opposite sides of said stud are the curved central portions of springs 61, said springs being retained on said stud by a washer 62. The ends of these springs are projected radially outward adjacent each other and in spaced relation, and projecting outwardly from the valve housing 38 and extending between the spaced ends of said springs are lugs or pins 63.

Arcuate slots 64 are formed in the side wall of housing 38 below the parallel ends of the springs 61 and projecting from the valve 44 outwardly through these slots between the spaced ends of the springs are pins or studs 65.

The construction just described and which is illustrated in Fig. 3 provides simple and efficient means for yieldingly maintaining the handle 46 that operates the valve 44 in neutral position, and under such conditions the port 47 occupies a position between and out of registration with the ports 39 and 40 and ball 54 occupies a position between the balls 49 and with valve 56 at the forward end of its movement so as to close ports 55.

When the handle 46 is moved in one direction or the other to effect operation of the window raising and lowering means, the pins 65 simultaneously flex one end of each of the springs 61 so as to store power therein and which power is exerted in subsequently restoring the handle and valve to their normal neutral positions when the handle is released.

Mounted on the piston rod 20 of the cylinder 18 is a structure that functions as a combined piston and brake or clutch, the same including a pair of oppositely arranged heads 66 that are practically identical in size, form and construction. These heads are arranged to slide freely for a limited distance upon the piston rod 20 and carried by the upper end of the upper head is a cup leather packing 67, the flange of which bears against the wall of the cylinder 18 and extends downwardly from the upper end of the upper head and a similar cup leather packing 68 is carried by the lower end of the lower one of the heads and the flange thereof extends upwardly against the inner face of the wall of the cylinder.

Formed in each head 66 is a centrally arranged recess 69 and located in the bottom of each recess is a packing ring 70 of suitable material that encircles the piston rod 20. Overlying each packing ring 70 is a ring 71 that encircles the piston rod and loosely mounted on the piston rod above the upper one of the rings and below the lower one of said rings are sleeves 72. A collar 73 that is mounted on the piston rod in the upper portion of the chamber in the upper one of the heads 66 and a similar collar 74 that is mounted on the lower end of the piston rod, provide stops to limit the sliding movement of the sleeves 72 away from the rings 71.

Surrounding the piston rod 20 and the sleeves 72 are expansive coil springs 75, the outer ends of which bear against the collars 73 and 74 respectively and the inner ends of said springs bear on the rings 71.

As a result of the construction just described, the heads 66 may move away from each other on the piston rod for limited distances or until the outer ends of the sleeves 72 contact with the collars 73 and 74.

The inner ends of the heads 66 are tapered toward the piston rod 20 and seated in the outer edges of the tapered ends are rings 76, preferably formed of hardened metal, preferably steel. Surrounding the tapered inner end portion of each head 66 is a plurality of arcuate segments 77, the outer faces of which are concentric with the inner face of the cylinder 18, and the adjacent inner corners of the two sets of these segments are cut away to form longitudinally and transversely curved surfaces 78 that combine to form a substantially circular channel for the accommodation of a plurality of spherical members 79.

The surfaces of these spherical members are engaged by the rings 76 and to normally maintain the two sets of segments in contracted position in contact with the spherical members 79, dished rings 80 of thin, resilient metal are positioned between the inner end portions of the heads 66 and the two sets of segments 77, with the outer edges of said resilient rings extending over the outer edges of said segments as illustrated in Fig. 1.

Positioned on the outer face of each segment 77 is a brake shoe 81 that preferably comprises an inner layer of metal and an outer layer of fabric similar to ordinary brake lining, which latter frictionally engages the inner face of the wall of cylinder 18 when the segments 77 are moved outwardly by the spherical members 79.

Formed through each head 66 to one side of the chamber 69 therein is a port 82 provided intermediate its ends with a valve seat 83 and normally resting on said seat is a ball check valve 84 and which is yieldingly maintained in such position by a spring 85, the outer end of which bears against a pin 86 that is seated in the head 66 and which extends across the port 82. These check valves are reversely arranged so that the valve in the upper one of the heads opens downwardly and the valve in the lower head opens upwardly.

Formed through those portions of the cup leather members 67 and 68 that are secured to the heads 66 and through the adjacent portions of the heads, are small ducts 87 which enable small amounts of air to bleed past the cup leathers.

Under normal conditions, with valve 44 maintained in neutral position under the influence of the springs 61, port 47 occupies a position between ports 39 and 40, and as the ball 54 is positioned between the balls 49 the packing ring 59 on disc 56 is maintained in position to close the ports 55 that admit air pressure into the valve housing 38.

Further, the piston assembly after traveling to its upper or lower limits of movement or to any intermediate position, is retained in such position by the frictional engagement of the brake shoes 81 with the wall of the cylinder, it being understood that the segments 77 carrying the brake shoes are moved outwardly by the balls 79 and which latter are forced outward under the expansive action of the springs 75 which tend to move the heads 66 toward each other. After the piston assembly comes to a stop within the cylinder, air pressure may bleed from those portions of the chambers in the piston above and below the piston assembly through the small ports 87, thus equalizing the air pressure within the piston chamber above and below the piston and in the chambers between the heads 66.

In Fig. 1, the piston assembly is shown at or near its upper limit of movement and with the window or panel to which the piston rod is connected, in closed position. To lower the window or panel, the handle 46 is shifted from the neutral position as illustrated in Fig. 3 to the position illustrated in Fig. 1, which movement rotates valve 44 so as to bring port 77 into registration with port 40 and exhaust port 43, and under such conditions one end of duct 48 is in communication with port 39. As valve 44 is thus moved, one of the balls 49 engages ball 54 and moves the same toward the chamber within the valve housing 50, thereby forcing disc 56 and packing ring 59 away from the ports 55, with the result that air under pressure passes from storage tank 12 through duct 52, through valve housing 50, thence through ports 55, duct 48, port 39, duct 41, and through the chamber 27 in valve housing 26 into the chamber in the upper end of the cylinder 18.

In passing into the chamber within the valve housing 26, the incoming compressed air will force the tubular valve 29 upwardly to its limit of movement against the pointed end of screw 31, thereby providing an opening of increased area into the chamber 27 and into the upper end of the chamber in cylinder 18, thus providing for a comparatively quick flow of a considerable volume of compressed air into the piston cylinder.

The compressed air thus admitted to the upper end of the piston cylinder will flow downward through port 82 past the downwardly opening ball check valve 84 into the chamber beneath the upper one of the heads 66 and said air passes downwardly through the space or openings between the heads 66 and between the segments 77 and the force of this air will be expended against the cup leather 68 that is carried by the lower one of the heads 66, with the result that the entire piston assembly will move downward within the cylinder 18 and consequently drawing downwardly the window or panel to which the piston rod 20 is connected.

As the piston assembly is thus moved downwardly within the cylinder 18, the compressed air beneath the lower one of the heads 66 will be forced out through valve housing 33, through the duct in tubular valve 34, which valve is maintained on its seat by spring 36, and this air after passing through duct 42 passes through ports 40 and 47 and discharges to atmosphere through exhaust port 43.

Inasmuch as the air that is driven out of the chamber in the lower portion of the cylinder 18 by the downward travel of the piston assembly can only escape through the restricted duct in tubular valve 34, such restricted flow will cause the air below the piston assembly to function as an air cushion to yieldingly resist the downward movement of the piston which is being moved downwardly by the air under pressure that enters the piston chamber above the piston assembly through the larger opening provided when tubular valve 29 is elevated.

As the lower one of the heads 66 is forced downward by the compressed air as just described and for the purpose of moving the piston assembly downward, said head will draw away from the balls 79 so as to permit the same to move inwardly and downwardly a short distance by gravity, thus relieving the segments 77 of the pressure of said balls and consequently relieving the pressure of the brake shoes against the wall of the cylinder, it being understood that as the heads thus move apart, the disc springs 80 will act to draw the segments 77 a short distance inwardly toward each other and thus there will be no engagement of the brake shoes with the cylinder wall during the travel of the piston within the cylinder.

At the ends of the travel of the piston, the expansive coil springs 75 will move the heads 66 toward each other and the engagement of the bearing rings 76 on the balls 79 will move the latter outward to expand the segments 77 and the brake shoes carried thereby so as to bring the latter into frictional engagement with the cylinder wall, thereby holding the piston assembly at the end of its travel.

To elevate the window or panel with which the raising and lowering device is associated, handle 46 is shifted into the position indicated by dotted lines $x$ in Fig. 3, and such action rotates valve 44 so that port 47 establishes communication between port 39 and exhaust port 43 and one end of the duct 48 communicates with port 40.

With the parts so positioned, compressed air after passing into and through the chamber in valve housing 50 passes through the open ports 55, duct 48, port 40, duct 42, and through valve housing 33 at the lower end of the cylinder, and in passing through said housing the tubular valve 34 will be forced downwardly to enable an increased volume flow of compressed air into the chamber in the lower end of the cylinder.

This air after passing through the ball check valve 84 carried by the lower head 66 passes upwardly through the chamber between the heads and acting upon the cup leather 67 carried by the upper one of the heads 66, will force the same, the piston rod 20, and the window or panel, upwardly to the desired closed or partly closed position.

As the compressed air acts on the cup leather carried by the upper one of the heads 66, the latter will be moved upward a short distance against the resistance offered by the upper one of the springs 75, thereby withdrawing the bearing 76 carried by the lower end of the upper head away from the balls 79 so that the latter may move inward a short distance under the influence of the disc springs 80, and thus the segments 77 carrying the brake shoes will be drawn inwardly away from the wall of the cylinder.

During this upward movement of the piston, the air in the cylinder above said piston will discharge through chamber 27, thence downwardly through the tubular valve 29, through duct 41, port 39, port 47, and out through exhaust port 43. As valve 29 remains on its seat during this exhaust flow of compressed air, the volume flow of said air will be restricted with respect to the inlet of air past the valve 34 which is now functioning as an inlet valve, and thus the air in the cylinder above the piston will function as an air cushion as the piston moves upward.

At the end of the upward travel of the piston, the upper one of the springs 75 will act to move the upper head 66 a short distance downward so that the bearing ring 76 carried by the upper head will engage the balls 79 and move the same outward a short distance to expand the segments 77 and the brake shoes carried thereby will frictionally engage the wall of the cylinder to maintain the piston assembly at the point to which it has traveled. After such movement, the compressed air in the chambers above and below and within the piston will be equalized due to the bleeding of air through the restricted ports 87.

Due to the sliding connection between the upper end of the piston rod 20 and the strap 21 on the lower edge of the window or panel, the piston rod may move a short distance upward after the upper edge of the window or panel has made contact with the head or top of the frame, and this movement is cushioned by the expansive spring 25 that is located between strap 21 and the collar 23.

Thus it will be seen that I have provided a window operating means that is relatively simple in construction, inexpensive of manufacture, and very effective in performing the functions for which it is intended.

It will be understood that minor changes in the size, form and construction of the various parts of my improved window operating means, may be made and substituted for those herein shown and described, without departing from the spirit of my invention, the scope of which is set forth in the appended claims.

I claim as my invention:

1. In a window or panel operating device, a cylinder, a piston rod arranged for operation through one end of said cylinder, which piston rod is connected to a sliding window or panel, a pair of spaced heads mounted for sliding movement upon the piston rod within said cylinder, two sets of segments yieldingly arranged between said heads, brake shoes carried by said segments for engaging the inner surface of the cylinder, spherical members arranged between said segments, which spherical members are moved outwardly by the heads on the piston rod as said heads move toward each other and manually operable valvular means for admitting compressed air to the ends of said cylinder to move the heads therein.

2. In a window or panel operating device, a cylinder, a piston rod arranged for operation through one end of said cylinder, which piston rod is adapted to be connected to a sliding window or panel, a pair of spaced heads mounted for sliding movement upon the piston rod within said cylinder, two sets of segments yieldingly arranged between said heads, brake shoes carried by said segments for engaging the inner surface of said cylinder, spherical members arranged between said segments, which spherical members move outwardly as the heads on the piston rod as said heads move toward each other and manually operable valvular means for admitting compressed air to one end of said cylinder and simultaneously permitting the discharge of air from the other end of said cylinder so as to cause said heads and parts associated therewith to move lengthwise within said cylinder.

3. A window or panel operating device as set forth in claim 1 and with means between said heads and piston rods for yieldingly resisting the movements of said heads away from each other.

4. In a window or panel operating device, a cylinder, controllable valvular means for admitting fluid pressure to the ends of said cylinder, a piston rod arranged for operation through one end of said cylinder, which piston rod is adapted to be connected to the window or panel to be operated, a pair of piston heads loosely mounted on said piston rod within the cylinder, two sets of opposed segments loosely arranged between said piston heads resilient members between said piston heads and segments for normally retaining same in contracted positions and brake shoes carried by said segments for engaging the inner surface of the cylinder wall when said segments are expanded to hold the piston heads and piston rod against movement within said cylinder.

5. A window or panel operating device as set forth in claim 4 and with spherical members arranged between said piston heads and segments for expanding said segments when said piston heads move toward each other.

6. A window or panel operating device as set forth in claim 4 and with means between said piston rod and piston heads for yieldingly resisting the movement of the piston heads away from each other.

7. A window or panel operating device as set forth in claim 4 and with check valves arranged for operation in said piston heads for controlling the admission of fluid pressure through said piston heads to the chamber between same.

8. A window or panel operating device as set forth in claim 4 and said piston heads being provided with fluid pressure bleed openings to permit slow discharge of fluid pressure from the chamber between said pistons.

WALTER F. SHETZLINE.